United States Patent Office 2,984,627
Patented May 16, 1961

2,984,627

INFRARED-SENSITIVE METAL-ACTIVATED ZINC SILICATE PHOSPHORS AND THEIR PREPARATION

Charles Frederick Wahlig and Hilmer Ernest Winberg, Wilmington, Del., assignors to E. I. du Pont de Nemours and Company, Wilmington, Del., a corporation of Delaware No Drawing. Filed Dec. 3, 1957, Ser. No. 700,287

7 Claims. (Cl. 252—301.6)

This invention relates to new luminescent compositions and to their preparation. More particularly, it relates to metal-activated zinc silicate phosphors which emit green light upon being irradiated with infrared radiation and to their preparation.

Phosphors capable of converting infrared radiation to visible light have practical utility in industrial operations carried out in the dark, for example, in the production of photographic film, photographic emulsions, and the like. They are also employed in night detection devices such as sniperscopes and in other applications important to nocturnal military operations. A number of such phosphors have been developed. Among the best are the alkaline earth selenides and sulfides promoted with cerium or europium in combination with samarium. However, these phosphors have been very difficult to prepare and europium and samarium of the purity required are limited in availability and high in cost. The present invention provides a new class of phosphors which are highly sensitive to infrared radiation and emit visible light upon being subjected to such radiation.

An object of this invention is to provide new luminescent compositions. Another object is to provide such compositions which upon being irradiated with infrared radiation emit light in the visible region of the spectrum. A more specific object is to provide metal activated zinc silicate phosphors which upon being excited by infrared radiation emit light in the green region of the spectrum. A further object is to provide a practical process for converting various activated zinc silicate phosphors which emit visible light upon being excited by ultraviolet radiation into phosphors which after previous excitation by means of short wave radiation emit visible light by being stimulated by infrared radiation. A still further object is to provide such a process which is dependable. Still other objects will be apparent from the following description of the invention.

The above objects are accomplished in accordance with the invention by subjecting an activated zinc silicate phosphor which is non-responsive to infrared radiation, to a temperature of at least 200° C. and a pressure of at least 5000 atmospheres for a period of at least 10 minutes. The phosphors are then removed from the reaction zone and then can be screened and/or reduced to the appropriate size by conventional procedures.

A convenient way for subjecting the activated zinc silicate phosphor, namely manganese- or titanium-activated zinc silicate phosphor, to the temperature and pressure conditions in accordance with this invention is by first compressing the phosphor into a pellet and placing the pellet in a closely fitted accurately machined, telescopic cup made of material capable of withstanding temperatures above 200° C. and pressures in excess of 5000 atmospheres without deformation. The charged receptacle is then placed in the monobloc apparatus described by P. W. Bridgman [Phys. Rev. 48, 893 (1935) and American Scientist 31, 16 (1943)], and the sample is subjected to a pressure of at least 5000 atmospheres while the temperature is raised gradually to at least 200° C. These conditions are maintained for more than 10 minutes. Thereafter the sample is allowed to cool while still under pressure. After cooling has taken place, the pressure is gradually released and the sample removed from the container.

The heating of the sample is effected by means of a two-piece electric heater of 1500-watt capacity, which surrounds the cylinder of the monobloc apparatus and is provided with independent controls for the upper and lower elements. The thermocouples leading to the controls are contained in $1/16$ inch square slots in $3/32$ inch thick, flat, high chrome steel patches held to the faces of the cylinder by means of electrically resistant tape. In order to record the approximate temperature of the sample, a third thermocouple is located $1/8$ inch from the bore of the cylinder.

The examples which follow illustrate this invention in its preferred aspects but are not intended to limit it.

*Example I*

A pellet (approximately 0.33 inch in diameter and 0.28 inch thick) of a commercial rhombohedral manganese-activated zinc silicate phosphor (known as the Radio Manufacturer's Association No. P1 oscilloscope and radar phosphor, see "An Introduction to Luminescence of Solids," by Leverenz, Table 21, following page 428, published by John Wiley & Sons, N.Y., 1950), is placed in the monobloc apparatus and the pressure on the sample raised to 4000 atmospheres over a period of 10 minutes. While the pressure is maintained at this level, the temperature is raised to 400° C. during 85 minutes. The pressure is then raised to 8000 atmospheres over a period of 9 minutes, held under these conditions for 1 hour, then again raised to 16,000 atmospheres over a period of 20 minutes. The sample is held at 400° C. under 16,000 atmospheres' pressure for 2 hours. The heat is shut off and a blast of air directed against the assembly to speed the rate of cooling. After cooling to 20° C. in the course of 1 hour, the pressure on the sample is slowly released. The treated sample shows faint greenish fluorescence under 3650 A. ultraviolet excitation which is not observed in the untreated phosphor. When exposed to ultraviolet irradiation at a wavelength of 2537 A. the treated and untreated phosphor samples exhibit strong green light emission of approximately equivalent brightness. However, a longer afterglow is shown by the treated sample. This afterglow is enhanced when the phosphorescing sample is irradiated with infrared. A very weak but visible burst of light is observed on infrared irradiation a full half-hour after excitation by the 2537 A. source is discontinued. On X-ray examination, the treated phosphor yields a pattern much more diffuse than that of the untreated phosphor suggesting that the treatment has produced lattice distortion or a reduction in particle size.

*Example II*

The phosphor of Example I is processed in the equipment of Example I at 400° C. for 2 hours at a maximum pressure of 8600 atmospheres. Phosphorescence and infrared stimulability are again induced but to a lesser extent than that of Example I.

*Example III*

The phosphor of Example I is processed at 200° C. under 16,000 atmospheres' pressure for 2 hours. Phosphorescence and infrared stimulability are again induced but to a lesser extent than in Examples I and II.

*Example IV*

A manganese-activated zinc silicate phosphor of the P1 type described in Example I but with decreased persistence is maintained at 400° C. while under 17,000 atmospheres' pressure for 2 hours and 10 minutes. Under 2537 A. excitation, the treated sample shows a green phosphorescence of long duration which is strongly stimulated by infrared radiation. In contrast, the untreated phosphor shows only a faint green phosphorescence of short duration which is not affected by infrared radiation.

*Example V*

A rhombohedral titanium-activated zinc silicate phosphor (Radio Manufacturer's Association No. P6 type, blue-component television phosphor) is treated in the manner given in Example I at a temperature of 400° C. and under a pressure of 22,000 atmospheres for 3 hours. When exposed to ultraviolet light of wavelength 2537 A., the untreated phosphor has negligible visible fluorescence, shows no phosphorescence, and is not affected by infrared radiation. After treatment, the phosphor fluoresces blue, shows a blue phosphorescence of moderate duration and is slightly stimulated by infrared radiation.

Zinc silicate phosphors activated with either manganese or titanium which are non-responsive to infrared radiation are commercially available and are described in chapters II and V of the textbook "Some Aspects of the Luminescence of Solids," by F. A. Kroger, Elsevier Publishing Co., Inc., New York (1948), and in the Leverenz textbook supra.

The pressures employed are at least 5000 atmospheres and usually are in excess of 8000 atmospheres and may be 22,000 atmospheres or higher. In fact, the maximum pressure which may be employed is restricted only by the physical limitations of the equipment.

Temperature and pressure are interdependent variables. If temperature of the order of 200° C. are used, then it is necessary to apply pressures of at least 16,000 atmospheres in order to obtain the desired activating effect. On the other hand, if temperatures of the order of 700° C. are used, pressures as low as 5000 atmospheres bring about infrared activation. The time period may vary from 10 minutes to 4 or more hours. Longer heating periods do not have any significant advantage.

In practice, pressure is built up at ordinary temperatures to about 4000 atmospheres in about 10 minutes and heating is adjusted so that the temperature selected is attained in about 1 hour. Thereafter pressure is gradually built up at a rate of about 4000-5000 atmospheres in about 10 minutes. The sample is maintained at the temperature and pressure for about 1.5 hours. In the reverse cycle, the sample is permitted to cool to room temperature at full pressure and the pressure is then released at approximately the same rate as it was built up.

The amount of manganese or titanium activator in the zinc silicate can be as little as 0.01% or as high as 5% by weight of the silicate. Usually the amount will range between 0.2 and 1.5% by weight of the silicate. Mixtures of manganese- and titanium-activated phosphors, as well as mixtures of the same phosphors with different amounts of the activators can be treated under the foregoing elevated temperatures and pressures.

The process of this invention makes possible the production of infrared-sensitive zinc silicate phosphors. This gives to this well-known class of phosphors new utility in fields of vision by irradiation with wavelengths outside the normal visible region. Thus, they find practical application in fluoroanalysis, in safelights for use in the production of photographic film and photographic emulsions, in detecting and measuring infrared radiations, in television screens and in military applications, e.g., sniperscopes and related detection devices.

The novel phosphors obtained by carrying out the practice of this invention are also useful in information storing and releasing apparatus or devices as in certain types of computing devices where an element containing the phosphor is first exposed to ultraviolet light or some other short wave radiation and then later subjected to infrared to release the stored information.

They are also useful in viewing and exposing devices in which a phosphor bearing layer is first excited uniformly by ultraviolet light, then exposed through a negative to infrared light to release light image-wise and finally moved to a position where the phosphor bearing layer is illuminated uniformly with infrared light to disclose a positive image. By this means a negative can be made from a negative or a positive from a positive without an intermediate photographic step by using the light released by the second infrared exposure to expose a film or paper which is not sensitive to infrared.

An advantage of the invention is that it provides a new class of infrared-sensitive zinc silicate phosphors. Another advantage is that it provides a practical and dependable method for obtaining such phosphors. Still other advantages of the invention will be apparent to those skilled in the art from the above description.

We claim:

1. The process of preparing infrared-sensitive zinc silicate phosphors which comprises subjecting a zinc silicate phosphor taken from the group consisting of manganese- and titanium-activated zinc silicate phosphors to a temperature of at least 200° C. and a pressure of at least 5000 atmospheres for a period of at least 10 minutes.

2. A process as set forth in claim 1 wherein the temperature is maintained between 200° C. and 700° C. and the pressure is maintained between 5000 and 22,000 atmospheres for a period of 10 minutes to 3 hours.

3. The process of converting an infrared-insensitive manganese-activated rhombohedral zinc silicate phosphor which emits visible light under ultraviolet light radiation into a modified phosphor which emits visible light when subjected to infrared radiation which comprises subjecting such a phosphor containing 0.2 to 1.5% by weight of manganese to a temperaure of at least 200° C. and a pressure of at least 5000 atmospheres for a period from 10 minutes to 4 hours.

4. An activated infrared-sensitive zinc silicate phosphor prepared by subjecting a zinc silicate phosphor taken from the group consisting of manganese- and titanium-activated rhombohedral zinc silicate phosphors to a temperature of at least 200° C. and a pressure of at least 5000 atmospheres for a period of at least 10 minutes.

5. A phosphor prepared according to claim 4 wherein the temperature is maintained between 200° C. and 700° C. and the pressure is maintained between 5000 and 22,000 atmospheres for a period of from 10 minutes to 3 hours.

6. A manganese-activated zinc silicate phosphor which exhibits strong green light emission upon being irradiated with infrared light prepared by subjecting a manganese-activated rhombohedral zinc silicate phosphor containing from 0.2 to 1.5% by weight of manganese to a temperature of from 200° C. to 700° C. and a pressure of from 5000 to 22,000 atmospheres for a period of from 10 minutes to 3 hours.

7. A titanium-activated zinc silicate phosphor which exhibits blue phosphorescence when stimulated by infrared radiation prepared by subjecting a titanium-activated rhombohedral zinc silicate phosphor containing from 0.2 to 1.5% by weight of titanium to a temperature of from 200° C. to 700° C. and a pressure of from 5000 to 22,000 atmospheres for a period of from 10 minutes to 3 hours.

References Cited in the file of this patent

UNITED STATES PATENTS

| | | |
|---|---|---|
| 2,192,864 | Isenberg | Mar. 5, 1940 |
| 2,210,087 | Leverenz | Aug. 6, 1940 |
| 2,247,192 | Fonda | June 24, 1941 |
| 2,462,517 | Leverenz | Feb. 22, 1949 |
| 2,505,621 | Leverenz | Apr. 25, 1950 |
| 2,684,885 | Nakken | July 27, 1954 |

OTHER REFERENCES

Leverenz text, "Luminescence of Solids," John Wiley & Sons, Inc., N.Y., 1950, pp. 79–80.